US012557131B2

United States Patent
Hu et al.

(10) Patent No.: US 12,557,131 B2
(45) Date of Patent: Feb. 17, 2026

(54) MONITORING CONTROL CHANNELS USING HIGHER LAYER CONFIGURATION

(71) Applicant: ZTE CORPORATION, Guangdong (CN)

(72) Inventors: Youjun Hu, Shenzhen (CN); Bo Dai, Shenzhen (CN); Huiying Fang, Shenzhen (CN); Luanjian Bian, Shenzhen (CN); Weiwei Yang, Shenzhen (CN); Kun Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 409 days.

(21) Appl. No.: 17/870,608

(22) Filed: Jul. 21, 2022

(65) Prior Publication Data
US 2023/0026076 A1 Jan. 26, 2023

Related U.S. Application Data

(63) Continuation of application No. PCT/CN2020/107748, filed on Aug. 7, 2020.

(51) Int. Cl.
*H04W 72/50* (2023.01)
*H04W 72/1273* (2023.01)
(Continued)

(52) U.S. Cl.
CPC ..... *H04W 72/535* (2023.01); *H04W 72/1273* (2013.01); *H04W 72/23* (2023.01); *H04W 76/28* (2018.02)

(58) Field of Classification Search
CPC ............. H04W 72/1273; H04W 72/23; H04W 72/535; H04W 72/231; H04W 72/232; H04W 76/27; H04W 76/28
See application file for complete search history.

(56) References Cited

U.S. PATENT DOCUMENTS

| 11,388,586 B2 * | 7/2022 | Yang ................. H04W 72/0446 |
| 2013/0039291 A1 * | 2/2013 | Blankenship ......... H04L 5/0094 370/329 |

(Continued)

FOREIGN PATENT DOCUMENTS

| CA | 3105895 A1 | 1/2020 |
| CN | 110167036 A | 8/2019 |

(Continued)

OTHER PUBLICATIONS

Ericsson: "Reduced PDCCH monitoring for Redcap" 3GPP TSG RAN WG1 #101, R1-2003290, May 25-Jun. 5, 2020, e-Meeting (10 pages).

(Continued)

*Primary Examiner* — Stephen J Clawson
(74) *Attorney, Agent, or Firm* — Foley & Lardner LLP

(57) ABSTRACT

Presented are systems, methods, apparatuses, or computer-readable media for monitoring control channels. A wireless communication device may receive, from a wireless communication node, a higher layer configuration. The wireless communication device may determine, according to the higher layer configuration, the upper limits. The upper limits may include a maximum number of physical downlink control channel (PDCCH) candidates to be monitored per slot (M-PDCCH) and a maximum number of non-overlapping control channel elements (CCEs) per slot (M-CC). The wireless communication device may determine at least one time domain duration to apply the upper limits. The wireless communication device may decode at least one PDCCH according to the upper limits, within the at least one time domain durations.

16 Claims, 3 Drawing Sheets

(51) Int. Cl.
*H04W 72/23* (2023.01)
*H04W 76/28* (2018.01)

(56) References Cited

U.S. PATENT DOCUMENTS

| | | | | |
|---|---|---|---|---|
| 2013/0250879 | A1* | 9/2013 | Ng | H04B 7/0689 |
| | | | | 370/329 |
| 2015/0223232 | A1* | 8/2015 | Eriksson | H04W 72/0446 |
| | | | | 370/329 |
| 2017/0118792 | A1 | 4/2017 | Rico Alvarino et al. | |
| 2018/0110045 | A1 | 4/2018 | You et al. | |
| 2019/0281620 | A1* | 9/2019 | Lu | H04W 72/0446 |
| 2020/0145984 | A1* | 5/2020 | Hosseini | H04L 5/0044 |
| 2020/0154413 | A1* | 5/2020 | Hosseini | H04W 72/0446 |
| 2021/0314927 | A1* | 10/2021 | Noh | H04L 5/0053 |
| 2021/0352501 | A1* | 11/2021 | Taherzadeh Boroujeni | |
| | | | | H04L 5/0053 |
| 2021/0385826 | A1* | 12/2021 | Moon | H04L 1/0046 |
| 2022/0038207 | A1* | 2/2022 | Frenne | H04L 1/0072 |
| 2022/0094467 | A1* | 3/2022 | Khoshnevisan | H04W 72/23 |
| 2022/0109597 | A1* | 4/2022 | Takeda | H04L 5/0064 |
| 2022/0201713 | A1* | 6/2022 | Beale | H04L 5/0053 |
| 2022/0225301 | A1* | 7/2022 | Khoshnevisan | H04L 5/0094 |
| 2022/0225378 | A1* | 7/2022 | Khoshnevisan | H04L 5/0094 |
| 2022/0377772 | A1* | 11/2022 | Takeda | H04W 24/08 |
| 2022/0386285 | A1* | 12/2022 | Hu | H04W 52/0229 |
| 2023/0262599 | A1* | 8/2023 | Jung | H04L 5/0007 |
| | | | | 370/311 |
| 2023/0337231 | A1* | 10/2023 | Bae | H04L 1/0072 |

FOREIGN PATENT DOCUMENTS

| | | | |
|---|---|---|---|
| CN | 110324127 | A | 10/2019 |
| CN | 110536387 | A | 12/2019 |
| CN | 110832931 | A | 2/2020 |
| CN | 111034145 | A | 4/2020 |
| KR | 10-2020-0020272 | A | 2/2020 |
| KR | 10-20200024344 | A | 3/2020 |
| WO | WO-2019/099435 | A1 | 5/2019 |
| WO | WO-2020/033647 | A1 | 2/2020 |
| WO | WO-2020/072963 | A1 | 4/2020 |

OTHER PUBLICATIONS

Extended European Search Report on EP 20948087.0 dated Jun. 29, 2023 (11 pages).
First Examination Report for IN Appln. No. 202227041559 dated Mar. 28, 2023 (with English translation, 5 pages).
International Search Report and Written Opinion for PCT Appl. No. PCT/CN2020/107748, mailed May 7, 2021 (9 pages).
ZTE et al.: "Remaining issues on initial access signals and channels for NR-U" 3GPP TSG RAN WG1 Meeting #99; R1-1911819; Nov. 22, 2019; Reno, USA (23 pages).
First Office Action for CN Appl. No. 202080104072.4, dated Aug. 5, 2024 (with English translation, 15 pages).
Second Office Action for CN Appl. No. 202080104072.4, dated Jan. 20, 2025 (with English translation, 17 pages).
Decision of Rejection on CN Appl. No. 202080104072.4 dated Jun. 24, 2025 (16 pages).

* cited by examiner

MONITORING CONTROL CHANNELS USING HIGHER LAYER CONFIGURATION

CROSS-REFERENCE TO RELATED APPLICATION

This application claims the benefit of priority under 35 U.S.C. § 120 as a continuation of PCT Patent Application No. PCT/CN2020/107748, filed on Aug. 7, 2020, the disclosure of which is incorporated herein by reference in its entirety.

TECHNICAL FIELD

The disclosure relates generally to wireless communications, including but not limited to systems and methods for monitoring control channels.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may receive, from a wireless communication node, a higher layer configuration. The wireless communication device may determine, according to the higher layer configuration, upper limits. The upper limits may include a maximum number of physical downlink control channel (PDCCH) candidates to be monitored per slot (M-PDCCH) and a maximum number of non-overlapping control channel elements (CCEs) per slot (M-CC). The wireless communication device may determine at least one time domain duration to apply the upper limits. The wireless communication device may decode at least one PDCCH according to the upper limits, within the at least one time domain durations.

In some embodiments, a higher layer configuration may include a feature that is configured, or is configured and enabled. In some embodiments, the wireless communication device may send, to the wireless communication node, an indication of a capability of the wireless communication device to support the feature. In some embodiments, the wireless communication device may determine whether the M-PDCCH and the M-CCE is defined on a per slot basis or over multiple slots. In some embodiments, the feature may include at least one of: coverage enhancement, a specific UE category, an antenna number, same slot scheduling, or cross slot scheduling.

In some embodiments, a higher layer configuration may include a feature that is configured, or is configured and enabled. In some embodiments, the wireless communication device may determine that the M-PDCCH is the same as a legacy PDCCH-related limit, the M-PDCCH is the same as or less than the legacy PDCCH-related limit, or the M-PDCCH is the same as or more than the legacy PDCCH-related limit.

In some embodiments, determining that the M-PDCCH is the same as or less than the legacy PDCCH-related limit may include the M-PDCCH having a candidate value that is the same as the legacy PDCCH-related limit, and at least another candidate value that is less than the legacy PDCCH-related limit. In some embodiments, determining that the M-PDCCH is the same as or more than the legacy PDCCH-related limit may include: the M-PDCCH having a candidate value that is the same as the legacy PDCCH-related limit, and at least another candidate value that is more than the legacy PDCCH-related limit.

In some embodiments, a higher layer configuration may include a feature that is configured, or is configured and enabled. In some embodiments, the wireless communication device may determine that the M-CCE is the same as a legacy CCE-related limit, the M-CCE is the same as or less than the legacy CCE-related limit, or the M-CCE is the same as or more than the legacy CCE-related limit.

In some embodiments, determining that the M-CCE is the same as or less than the legacy CCE-related limit may include: the M-CCE having a candidate value that is the same as the legacy CCE-related limit, and at least another candidate value that is less than the legacy CCE-related limit. In some embodiments, determining the M-CCE is the same as or more than the legacy CCE-related limit may include: the M-CCE having a candidate value that is the same as the legacy CCE-related limit, and at least another candidate value that is more than the legacy CCE-related limit.

In some embodiments, the M-PDCCH and the M-CCE are at least one of: configured on a per bandwidth part (BWP) basis according to the higher layer configuration, configured on a per search space (SS) basis according to the higher layer configuration, configured via a radio resource control (RRC) configuration, or configured for a target control resource set (CORESET) or target group SS according to the higher layer configuration.

In some embodiments, the wireless communication device may determine the M-PDCCH and the M-CCE according to a target number of search spaces (SSs). If the target number of SSs is larger than or equal to a threshold, the M-PDCCH and the M-CCE may include legacy limits. If the target number of SSs is less than the threshold, the M-PDCCH and the M-CCE may include non-legacy or redefined limits.

In some embodiments, the wireless communication device may determine the wireless communication device, the M-PDCCH and the M-CCE according to a target number of search spaces (SSs) by: determining that the target number of SSs is within a first range of a plurality of ranges; and determining the M-PDCCH and the M-CCE according to the first range. In some embodiments, a number of the ranges (n) is configured as a default value or via at least one radio resource control (RRC) parameter of $\log_2(n)$ or $\lceil \log_2(n) \rceil$ number of bits.

In some embodiments, the wireless communication device may determine the M-PDCCH and the M-CCE as comprising legacy or non-legacy limits, according to a target type of SS. In some embodiments, the wireless communication device may determine the M-PDCCH and the M-CCE as comprising legacy or non-legacy limits, according to a target type of SS, or the target number of SSs and the target type of SS. In some embodiments, the at least one time domain duration to apply the upper limits may include: at least one target slot, at least one target search space (SS), or at least one target slot or PDCCH occasion of the target SS.

In some embodiments, the wireless communication device may determine the at least one time domain duration to apply the upper limits, according to: a predefined time domain duration, a radio resource control (RRC) configuration, a timer, downlink control information (DCI), or a bandwidth part (BWP). In some embodiments, the wireless communication device may determine, according to a number (X) of bits in the RRC configuration or DCI, which of a number (H) of time domain durations to apply the upper limits which comprise non-legacy limits.

In some embodiments, the wireless communication device may determine the at least one time domain duration to apply the upper limits as comprising legacy or non-legacy limits, according to a configuration for discontinuous reception (DRX). In some embodiments, the wireless communication device may determine a first of an even slot and an odd slot as comprising the legacy limits, and a second of the even slot and the odd slot as comprising the non-legacy limits, wherein the first or the second is a target slot.

In some embodiments, the wireless communication device may determine, prior to start of onDurationTimer, to apply the upper limits as comprising non-legacy limits. In some embodiments, the wireless communication device may determine, after the start of the onDurationTimer, to apply the upper limits as comprising legacy limits.

At least one aspect is directed to a system, a method, an apparatus, or a computer-readable medium. A wireless communication node may send, to a wireless communication device, a higher layer configuration. The wireless communication device may be caused to determine, according to the higher layer configuration, the upper limits. The upper limits may include a maximum number of physical downlink control channel (PDCCH) candidates to be monitored per slot (M-PDCCH) and a maximum number of non-overlapping control channel elements (CCEs) per slot (M-CCE). The wireless communication device may be caused to determine at least one time domain duration to apply the upper limits. The wireless communication device may be caused to decode at least one PDCCH according to the upper limits, within the at least one time domain durations.

At least one aspect is directed to a system, a method, an apparatus, or a computer-readable medium. A wireless communication device may receive, from a wireless communication node, a higher layer configuration. The wireless communication device may determine the wireless communication device, upper limits for PDCCH monitoring. The wireless communication device may decode at least one PDCCH according to the upper limits.

In some embodiments, the wireless communication device may determine the upper limits according to a coverage enhancement feature, a user equipment (UE) category, antenna number, or same slot scheduling or cross slot scheduling, or radio resource control (RRC) configuration.

In some embodiments, the upper limits for PDCCH monitoring may include at least one of: a maximum number of physical downlink control channel (PDCCH) candidates to be monitored in one or more slots (M-PDCCH) or a maximum number of non-overlapping control channel elements (CCEs) in one or more slots (M-CCE).

In some embodiments, the wireless communication device may determine that at least one of: the M-PDCCH is the same as or less than a legacy PDCCH-related limit, or the M-CCE is the same as or less than a legacy CCE-related limit. In some embodiments, the higher layer configuration may be used to trigger the upper limits for PDCCH monitoring, or to indicate one or more values for the upper limits.

In some embodiments, the higher layer configuration may be at least one of: configured on a per bandwidth part (BWP) basis according to the higher layer configuration, or configured on a per search space (SS) basis according to the higher layer configuration, or configured via a radio resource control (RRC) configuration, or configured for a target control resource set (CORESET) or target SS group according to the higher layer configuration.

In some embodiments, the wireless communication device may determine the upper limits according to a target number of search spaces (SSs). If the target number of SSs is larger than or equal to a threshold, the upper limits may include legacy limits. If the target number of SSs is less than the threshold, the upper limits may include non-legacy or redefined limits.

In some embodiments, the wireless communication device may determine the upper limits according to a target number of search spaces (SSs) by determining that the target number of SSs is within a first range of a plurality of range. In some embodiments, the wireless communication device may determine the upper limits according to a target number of search spaces (SSs) by determining the upper limits according to the first range.

In some embodiments, the wireless communication device may determine the upper limits as including legacy or non-legacy limits, according to a target type of SS, or the target number of SSs and the target type of SS.

In some embodiments, the wireless communication device may determine target slots to apply the upper limits for PDCCH monitoring, according to: configured slots, via a radio resource control (RRC) configuration; slots types, comprising semi persistent scheduling downlink (SPS-DL) slots or non-SPS-DL slots; slots types, comprising configured grant uplink (CG-UL) slots or non-CG-DL slots, or at least one slot index with legacy or non-legacy limits.

In some embodiments, the wireless communication device may determine a time duration to apply the upper limits, according to: a predefined time domain duration, a radio resource control (RRC) configuration, a timer, downlink control information (DCI), or a bandwidth part (BWP).

In some embodiments, the wireless communication device may determine at least one time domain duration or at least one target slot to apply the upper limits. In some embodiments, the wireless communication device may decode at least one PDCCH according to the upper limits, within the at least one time domain duration or the at least one target slot.

In some embodiments, the wireless communication device may determine the at least one time domain duration or the at least one target slot to apply the upper limits, according to a configuration for discontinuous reception (DRX). The upper limits may include legacy or non-legacy limits.

In some embodiments, the wireless communication device may determine a first of an even slot and an odd slot as comprising the legacy limits, and a second of the even slot and the odd slot as comprising the non-legacy limits. The first or the second may be a target slot.

In some embodiments, the wireless communication device may determine the at least one time domain duration or the at least one target slot according to onDurationTimer. In some embodiments, the wireless communication device may determine the at least one time domain duration or the at least one target slot according to Inactivity-timer. In some embodiments, the wireless communication device may send, to the wireless communication node, an indication of a capability of the wireless communication device to support a feature of the upper limits.

At least one aspect is directed to a system, a method, an apparatus, or a computer-readable medium. A wireless communication node may send, to a wireless communication device, a higher layer configuration. The wireless communication device may be caused to determine upper limits for PDCCH monitoring; and decode at least one PDCCH according to the upper limits.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |
| BWP | Bandwidth Part |
| CCE | Control Channel Element |
| CE | Control Element |
| CG | Configured Grant |
| CN | Core Network |
| CORESET | Control Resource Set |
| CSI-RS | Channel State Information, Reference Signal |
| DCI | Downlink Control Information |
| DL | Down Link or Downlink |
| DRX | Discontinuous Reception |
| IE | Information Element |
| LCID | Logical Channel Identifier |
| NCGI | NR Cell Global Identifier |
| NG | Next Generation |
| NW | Network |
| OFDM | Orthogonal Frequency-Division Multiplexing |
| OFDMA | Orthogonal Frequency-Division Multiple Access |
| PDCCH | Physical Downlink Control Channel |
| PDCP | Packet Data Convergence Protocol |
| PDSCH | Physical Downlink Shared Channel |
| PHY | Physical Layer |
| PUCCH | Physical Uplink Control Channel |
| RA | Random Access |
| REDCAP | Reduced Capability |
| RLC | Radio Link Control |
| RNTI | Radio Network Temporary Identifier |
| RRC | Radio Resource Control |
| SCS | Subcarrier Spacing |
| UE | User Equipment |
| UL | Up Link or Uplink |

1. Mobile Communication Technology and Environment

Figure 1:
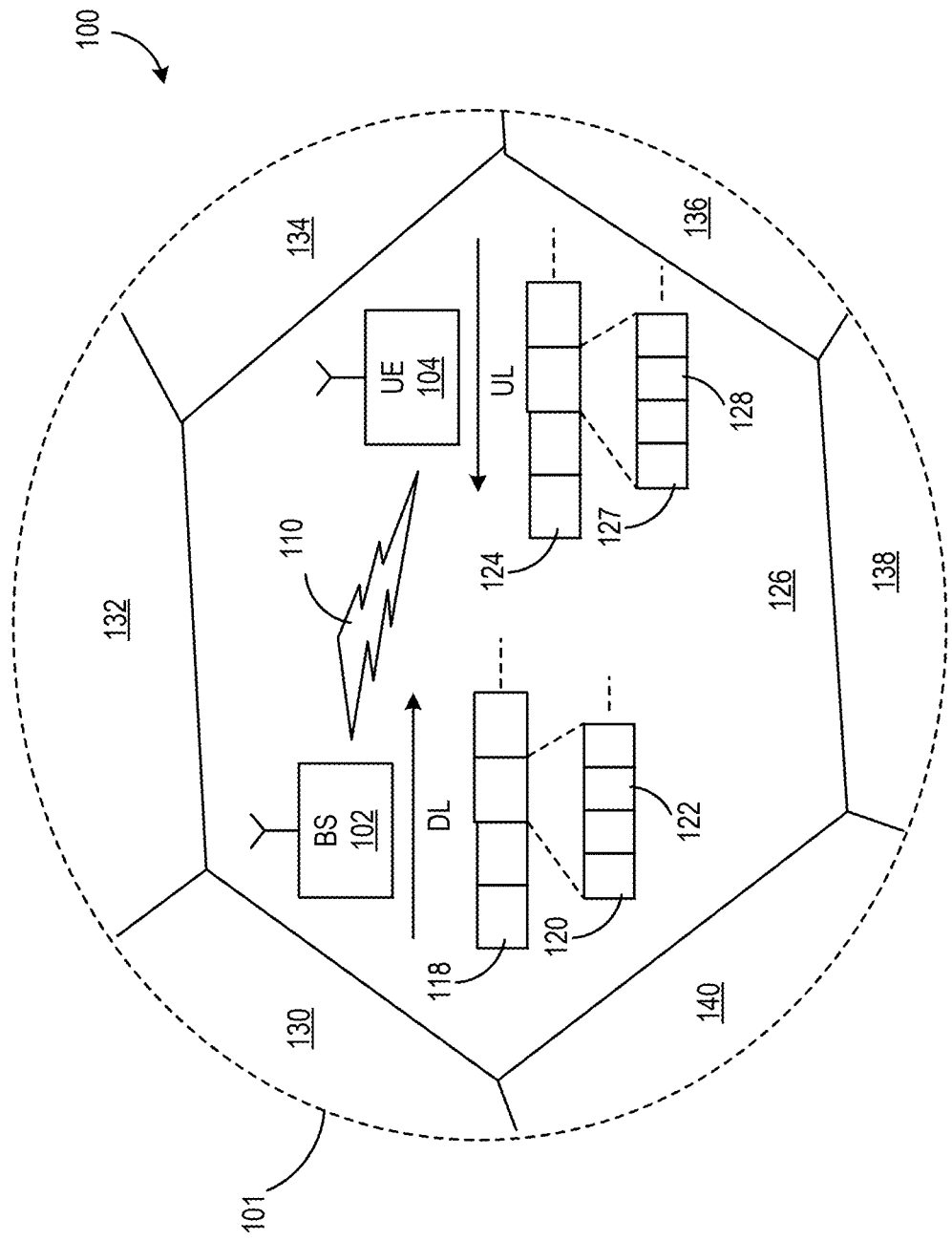
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
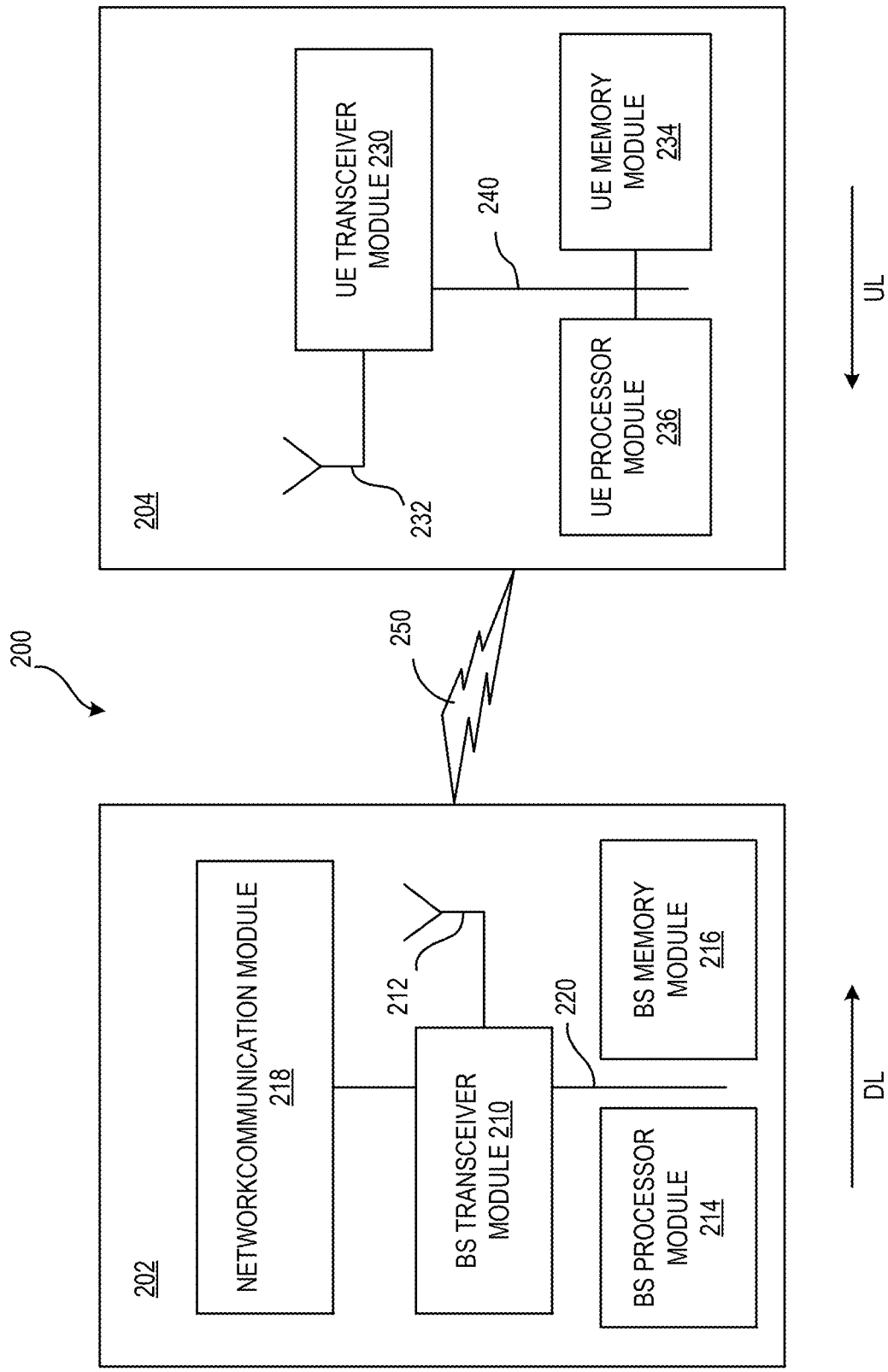
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Monitoring Control Channels Using Higher Layer Configuration In the 5G new radio access technology (NR) communication systems, the user equipment (UE) (e.g., the UE 104 or 204 as detailed above) decoding the PDCCH may be limited by the maximum number of monitored PDCCH candidates and maximum number of non-overlapped control channel elements (CCEs). For REDCAP (reduced capability) UE, lower power saving and UE complexity may be used. Therefore, more power saving and less complexity by limiting the CCE number and PDCCH candidates can be an effective method. Simulation results show that the power saving techniques can reduce the UE power consumption compared with the legacy PDCCH candidates limits. At the same time, less PDCCH candidates may mean less CCE number. By reducing the CCE number and PDCCH candidates, power saving and complexity reducing may be achieved.

The user equipment (UE) should receive the uplink scheduling grant information, prior to sending physical uplink shared channel (PUSCH) and downlink scheduling allocation information for receiving physical downlink shared channel (PDSCH). The information may be included in the downlink control information (DCI) and may be sent by the base station to the UE on the PDCCH channel in different DCI formats. Thus, the UE should first monitor the PDCCH. When UE decodes the PDCCH, the number of monitored PDCCH candidates per slot in a BWP and the number of non-overlapped CCEs per slot in a BWP may be limited as following manner.

Table 10.1-2 provides the maximum number of monitored PDCCH candidates, $M_{PDCCH}^{max,slot,\mu}$, per slot for a UE in a DL bandwidth part (BWP) with a subcarrier spacing (SCS) configuration $\mu$ for operation with a single serving cell.

TABLE 10.1-2

Maximum number $M_{PDCCH}^{max,\ slot,\ \mu}$ of monitored PDCCH candidates per slot for a DL BWP with SCS configuration $\mu \in \{0, 1, 2, 3\}$ for a single serving cell:

| $\mu$ | Maximum number of monitored PDCCH candidates per slot and per serving cell $M_{PDCCH}^{max,\ slot,\ \mu}$ |
|---|---|
| 0 | 44 |
| 1 | 36 |
| 2 | 22 |
| 3 | 20 |

Table 10.1-3 provides the maximum number of non-overlapped CCEs, $C_{PDCCH}^{max,slot,\mu}$, a DL BWP with SCS configuration $\mu$ that a UE is expected to monitor corresponding PDCCH candidates per slot for operation with a single serving cell. CCEs for PDCCH candidates may be identified as non-overlapped if the candidates correspond to different CORESET indexes, or different first symbols for the reception of the respective PDCCH candidates.

TABLE 10.1-3

Maximum number $C^{max,slot,\mu}_{PDCCH}$ of non-overlapped CCEs per slot for a DL BWP with SCS configuration $\mu \in \{0, 1, 2, 3\}$ for a single serving cell

| $\mu$ | Maximum number of non-overlapped CCEs per slot and per serving cell $C^{max,slot,\mu}_{PDCCH}$ |
|---|---|
| 0 | 56 |
| 1 | 56 |
| 2 | 48 |
| 3 | 32 |

The above table may be referred to the legacy limits for PDCCH decoding. The redefined (or non-legacy) table or value for PDCCH decoding is called redefined limits, and the redefined limits may include the legacy limits. The legacy limits and redefined limits may belong to the limits.

The operation of the UE to monitor the PDCCH may be performed on the control resource set and the PDCCH monitoring occasions for a search space set. The relevant monitoring parameters of the PDCCH may be included in the SearchSpace field of the radio resource control (RRC) signaling. The searchSpaceId and the controlResourceSetId information elements (IE) may indicate the search space set index and the control resource set (CORESET) applicable for this SearchSpace for PDCCH monitoring. The searchSpaceType IE in SearchSpace field may indicate the search space type of the PDCCH that the UE is expected to monitor. That is, the common search space (CSS) or UE-Specific search space may correspond to different DCI formats to be detected, and the common search space may be a Type3-PDCCH CSS or called as UE group CSS.

In some embodiments, UE may forego monitoring more PDCCH candidates and CCE number, thereby reducing the CCE number limits. Thus, actual blind decoding can be an effective method to save power and reduce UE complexity. In some embodiments, PDCCH candidates and CCE number limits may be different for coverage enhancement (CE) scenario and non-CE scenario. The PDCCH candidates and CCE number limits may be configured per BWP, per SS basis, or are configured by other RRC to be different for different UE categories. These may be different for different antenna number, are different for cross slot scheduling or same slot scheduling. The PDCCH candidates and CCE number limits maybe set for the different number of target SS number, or set for the SS type and number, et cetera.

In some embodiments, besides the specific PDCCH candidates and CCE number limits in several cases, the target slots being limited (via the PDCCH-CCE limits) can be defined by higher layers, such as: discontinuous reception (DRX), radio resource control (RRC) parameters or BWP related parameters, among others.

A. Coverage Enhancement, UE Category, Antenna Number, and Same Slot Scheduling as Features The UE may monitor PDCCH in a slot. In conjunction, the UE may perform blind detection, of which the number of attempts may not exceed the new, redefined limit or count. In some cases, coverage enhancement (CE), the PDCCH candidates and CCE number limits PER slot in this case can be further considered. As for a non-CE case, the limits can be the same as legacy limits. The UE categories, antenna number, same slot scheduling may have similar applicability. Two cases (or scenarios) may be considered: (1) for low-end, non-coverage enhancement, one antenna or same slot scheduling scenario; and (2) for high-end, coverage enhancement, 2 antenna or cross slot scheduling scenario.

1. Case 1: Low-End, Non-Coverage Enhancement, One Antenna, or Same Slot Scheduling Scenario Under the first case, for a UE, if the feature is not configured or is configured but not enabled, the maximum number $M_{PDCCH}^{max,slot,\mu}$ of monitored PDCCH candidates per slot for a DL BWP with SCS configuration $\mu \in \{0, 1, 2, 3\}$ for a single serving cell can be the same as legacy value or can be configured to be less than the legacy value for $M_{PDCCH}^{max,slot,\mu}$. The maximum number of non-overlapped CCEs per slot for a DL BWP with SCS configuration $M_{PDCCH}^{max,slot,\mu}$ and per serving cell $C_{PDCCH}^{max,slot,\mu}$ may be kept the same or can be configured less than the legacy value for $C_{PDCCH}^{max,slot,\mu}$.

2. Case 2: High-End, Coverage Enhancement, Two Antennae, or Cross Slot Scheduling Scenario Under the second case, for a UE, if the feature is configured (automatically enabled), or is configured and enabled (e.g., by an enable bit), the IE UECapabilityInformation message may be used to transfer UE radio access capabilities (see above features, e.g., coverage enhancement) requested by the network. The UEAssistanceInformation message may be used for the indication of UE assistance information to report which features the UE is requesting (e.g., to indicate which feature it lacks) to the network. Therefore, the capability for supporting these features can be delivered to the gNB by UE capability report or UE assistance information. The above can be related to, or independent from the following.

The gNB can configure the feature in MIB, SIB or other RRC parameters. If the feature is configured or enabled for a UE, The $M_{PDCCH}^{max,slot,\mu}$ and $C_{PDCCH}^{max,slot,\mu}$ can be defined based on per slot (legacy method) or a per multiple slots basis. For example, $M_{PDCCH}^{max,slot,\mu}$ and $C_{PDCCH}^{max,slot,\mu}$ can be defined on multiple slots, where the number of slots for $M_{PDCCH}^{max,slot,\mu}$ and $C_{PDCCH}^{max,slot,\mu}$ is determined by the slots number occupied by the PDCCH for CE scenario. The CCE number limit may be defined as $C_{PDCCH}^{max,slot,\mu}$.

Continuing with the same second case, the $C_{PDCCH}^{max,slot,\mu}$ can be configured in at least three different manner. First, the $C_{PDCCH}^{max,slot,\mu}$ can be configured to be the same as legacy limits. This may mean that for different cases, UE may have the same PDCCH and CCE number limits. Second, the $C_{PDCCH}^{max,slot,\mu}$ can be configured to be less than or equal than the legacy. This may mean that for each corresponding SCS in a BWP, the new CCE number limits $C_{PDCCH}^{max,slot,\mu}$ value may be less than or equal than the legacy. Third, the $C_{PDCCH}^{max,slot,\mu}$ can be configured to be larger than or equal than the legacy. This may mean that for each corresponding SCS in a BWP, the new CCE number limits $M_{PDCCH}^{max,slot,\mu}$ value may be larger than or equal than the legacy.

For example, suppose that under the coverage enhancement in the second came, the number of CCE decreased thus resulting in the reduction in the ratio X described below.

Example 1-1: The coefficient may be based on the symbol number of PDCCH for the second case, based on the number of CCE of PDCCH for case2, or based on a linear relationship of the foregoing. The coefficient for $C_{PDCCH}^{max,slot,\mu}$ can be defined as $$X = \frac{X1}{X2} \text{ or } X = n.$$

X1 is the number of symbols or CCE for PDCCH in the second case. X2 is the number of symbols or CCE for legacy PDCCH, n is a constant, default or configured by higher layer, or X1/n is the number of slots for PDCCH. Additionally, the coefficient also can be written as $$X = \left[\frac{X1}{X2}\right]$$

to ensure an integer number for X.

| $\mu$ | Maximum number of non-overlapped CCEs per slot and per serving cell $C^{max,slot,\mu}_{PDCCH}$ |
|---|---|
| 0 | 56*X |
| 1 | 56*X |
| 2 | 48*X |
| 3 | 32*X |

Example 1-2: The maximum number may be larger than or equal to legacy. The $C_{PDCCH}^{max,slot,\mu}$ can be configured as a value from the following configured range for each SCS in a BWP:

| $\mu$ | Maximum number of non-overlapped CCEs per slot (or multi slots) and per serving cell $C^{max,slot,\mu}_{PDCCH}$ |
|---|---|
| 0 | 56~112 or 56~56*3 |
| 1 | 56~112 or 56~56*3 |
| 2 | 48~96 or 48~48*3 |
| 3 | 32~64 or 32~32*3 |

Example 1-3: The maximum number may be less than or equal to legacy.

| $\mu$ | Maximum number of non-overlapped CCEs per slot and per serving cell $C^{max,slot,\mu}_{PDCCH}$ |
|---|---|
| 0 | 56/52/50/48/42/40/36/38/32 |
| 1 | The same values as with u = 0, or not exactly the same values |
| 2 | 48/44/40/36/32/30/28/24/20 |
| 3 | 32/30/28/24/22/20/16/18/12 |

PDCCH candidates may limit $M^{max,slot,\mu}_{PDCCH}$ PDCCH For the second case, the $M^{max,slot,\mu}_{PDCCH}$ PDCCH can be configured as three options, which is similar with $C^{max,slot,\mu}_{PDCCH}$. Similar with the above analysis about CCE number, the PDCCH candidates limits can be shown as the following example.

Example 1-4: The coefficient may be based on the symbol number of PDCCH for case2, based on the number of CCE of PDCCH for case2, or based on linear relationship of foregoing. The coefficient for $M^{max,slot,\mu}_{PDCCH}$ may be described as $$X = \left[\frac{X1}{X2}\right] \text{ or } X = n.$$

X2 may refer to the number of symbols or CCE for PDCCH in the second case. X1 may refer to the number of symbols/CCE for legacy PDCCH, n is a constant, default or configured by high layer, or X1/n means the number of slots for PDCCH. Additionally, the coefficient also can be written as $$X = \left[\frac{X1}{X2}\right]$$

to promise an integer for X.

| $\mu$ | Maximum number of monitored PDCCH candidates per slot and per serving cell $M^{max,slot,\mu}_{PDCCH}$ |
|---|---|
| 0 | 44X |
| 1 | 36X |
| 2 | 22X |
| 3 | 20X |

The $M^{max,slot,\mu}_{PDCCH}$ or $C^{max,slot,\mu}_{PDCCH}$ can be configured as a value from the following configured range for each SCS in a BWP.

Example 1-5: $M^{max,slot,\mu}_{PDCCH}$ may be larger than or equal to legacy:

| $\mu$ | Maximum number of monitored PDCCH candidates per slot and per serving cell $M^{max,slot,\mu}_{PDCCH}$ |
|---|---|
| 0 | 44~88 |
| 1 | 36~72 |
| 2 | 22~44 |
| 3 | 20~40 |

Example 1-6: $M^{max,slot,\mu}_{PDCCH}$ may be less than or equal to legacy:

| $\mu$ | Maximum number of monitored PDCCH candidates per slot and per serving cell $M^{max,slot,\mu}_{PDCCH}$ |
|---|---|
| 0 | 44/40/3 6/32/30/28/24/22/20 |
| 1 | 36/32/30/28/24/20/28/16/14 |
| 2 | 22/20/18/16/14/11/12/10/8 |
| 3 | 20/28/14/16/12/10/8/7 |

The configuration for CCE number limits and PDCCH candidates limits can be individually configured. For example, for the CE scenario, the $C^{max,slot,\mu}_{PDCCH}$ can be larger, and the $M^{max,slot,\mu}_{PDCCH}$ can be less.

Additionally, new $C^{max,slot,\mu}_{PDCCH}$ and $M^{max,slot,\mu}_{PDCCH}$ can be based on an inverse relationship. For example, in CE scenario, the new CCE number limits is mi, legacy limits of PDCCH candidates is C, legacy limits of CCE number is $m_0$. The new PDCCH candidates may limit X can be $$X = C\frac{m_0}{m_1} \text{ or } X = C\left[\frac{m_o}{m_1}\right] \text{ or } X = C\left\lceil\frac{m_o}{m_1}\right\rceil.$$

The new CCE number limits $m_1$ can be defined as:

$$m_1 = \frac{C}{X}m_0 \text{ or } m_1 = \left[\frac{C}{X}m_0\right] \text{ or } m_1 = \left\lceil\frac{C}{X}m_0\right\rceil$$

B. Configuration According to BWP, Search Space-Related Parameters, or RRC Parameters In some embodiments, max PDCCH candidate or CCE may be configured on a PER BWP basis. This may mean that each configuration can be configured for each BWP. BWP switching (to another BWP) may mean that the configuration may change. In some embodiments, the max PDCCH candidate or CCE is configured on a per search space (SS) basis: This may means that each configuration can be configured for each searchspace. Different SS may mean that the configuration may change. In some embodiments, the max PDCCH candidate or CCE is configured based on a RRC configuration. This may mean that the CCE number and PDCCH candidates limits are configured by RRC signaling/configuration. In some embodiments, the max PDCCH candidate or CCE is configured on a per CORESET configuration basis, and this may mean that each configuration can be configured for each CORESET. These and other configurations are discussed below in detail.

1. Option 1: RRC Configuration

The CCE number and PDCCH candidates limits may be configured by RRC parameters. The RRC-based indication method can be shown as following. A field may include N*X bits. Every N bits may indicate whether a certain SS is limited or whether the specific CCE number/PDCCH candidates is limited. If N=1, this may be a bitmap method. One bit may be used to indicate the legacy limits or redefined limits. If N>1, then multiple or N bits may be used to identify which table to use (including legacy and new defined tables). For example, when N=4, this may mean that four tables are to be identified.

As for the coefficient X, X can be equal to the number of total configured Search spaces, including all the (Common SS) CSS and (UE-specific SS) USS. In some embodiments, X can be equal to the number of the configured USS. In some embodiments, X can be equal to the number of UE group common CSS (type 3 CSS) and USS. In some embodiments, X can be equal to the number of SS indicated by searchSpacesToAddModList parameter in PDCCH-Config.

The relationship between SS and N*X bits may be as follows. From the large SS ID to small SS ID number, each of the SSs may correspond to a set of N bits. From the small SS ID to large SS ID number (e.g., 0-9), each SS may correspond to a set of N bits. For example, for the latter case (small SS ID to large), when N=1, X=3 (with N*X=3 bits in the field) and the corresponding SS IDs are 7, 3, 8. The first bit in this field may indicate whether the CCE and PDCCH candidates limits is the same as legacy or not when the UE monitors and decodes SS ID=3. The second bit may indicate for SS ID=7 and the third bit may indicate for SS ID=8. If the legacy limits are not adopted, the redefined limits can take on any table and method described herein.

2. Option 2: Per BWP-Basis

The PDCCH candidates or CCE number limits may be configured on BWP related parameters. For example, add a new field in BWP-DownlinkDedicated, pdcch-Config, BWP-Downlink, or BWP. The redefined limits can take on any table and method described herein.

3. Option 3: Per SS-Basis

In the Searchspace IE (in higher layer signaling, e.g., RRC signaling), adding a field with one bit (at a predefined value) or the presence or existence of the bit, or N bits may indicate that the PDCCH candidates and CCE number limits are to be redefined for this search space. For example,

```
        ...
      }
    }
    OPTIONAL  -- Cond Setup2
  }
  Candidatelimit
  CCElimit
  candidateAndCCElimit
-- TAG-SEARCHSPACE-STOP
-- ASN1STOP
```

In some embodiments, the existence or the presence of a candidatelimit may mean that the number of PDCCH candidates is to have redefined limits. This field may be one bit and when the field indicates 1 (or 0), the field may mean that the UE is to use the redefined PDCCH candidates limits to monitor or decode this SS.

In some embodiments, the existence or the presence of the CCElimit may mean to use the redefined limits. This field may be 1 bit. When the field indicates 1 (or 0) meaning that the UE is to use the redefined CCE number limits to monitor or decode this SS.

In some embodiments, the existence or the presence of the candidateAndCCElimit may mean the redefined limits. This field may be 1 bit. When the field indicates 1 (or 0) meaning that the UE is to use the redefined CCE number or PDCCH candidates limits to monitor or decode this SS.

The redefined limits may be specified. For different subcarrier spacing (SCS), according to the signaling, the redefined PDCCH candidates or CCE number limits in a field can be defined as following:

| | |
|---|---|
| u = 0 | an integer interval or range, or n values |
| u = 1 | an integer interval or range, or n values |
| u = 2 | an integer interval or range, or n values |
| u = 3 | an integer interval or range, or n values | u=0, 1, 2, 3 each may indicate a different SCS. The interval may refer to a range of integer values (e.g., 30-44). An integer interval may mean that the redefined PDCCH candidates or CCE number limits for a SCS is an integer ranging (e.g., 30-44). "n values" may refer to the redefined PDCCH candidates or CCE number limits for which a SCS is one of the n listed values. This may use $\log_2(n)$ or $\lceil \log_2(n) \rceil$ bits to indicate. For example, n–2 (or >2 values, such as 44 or 22):

| $\mu$ | Maximum number of monitored PDCCH candidates per slot and per serving cell $M_{PDCCH}^{max,slot,\mu}$ |
|---|---|
| 0 | 44/22 |
| 1 | 36/18 |
| 2 | 22/11 |
| 3 | 20/10 |

| $\mu$ | Maximum number of non-overlapped CCEs per slot and per serving cell $C_{PDCCH}^{max,slot,\mu}$ |
|---|---|
| 0 | 56/28 |
| 1 | 56/28 |
| 2 | 48/24 |
| 3 | 32/16 |

In other words, for [u=0 SCS=15 kHz], the PDCCH candidates for the target slot can be configured as 44 or 22. Similarly, if n is not large, multiple tables may be defined. For example n=2, there may be two tables: the legacy table and the redefined limits as shown in the following table:

| $\mu$ | Maximum number of monitored PDCCH candidates per slot and per serving cell $M^{max,slot,\mu}_{PDCCH}$ |
|---|---|
| 0 | 22 |
| 1 | 18 |
| 2 | 11 |
| 3 | 10 |

The two tables can be indicated, identified, or selected by 1 bit in RRC Parameters or DCI fields.

In some embodiments, across some different SCSs (u=0, 1, 2, 3; or u=1, 3), the UE on a slot may have the same PDCCH candidates or CCE number limits, which can be indicated by the RRC parameters. In some embodiments, if the PDCCH candidates or CCE number limits (for a certain SCS) is set as 0, this may mean that UE is not to monitor the corresponding slots. In some embodiments, the redefined limits may include the legacy value or null (0).

4. Option 4: Per CORESET or Group of SS Basis

Configured with the target CORESET (a location in frequency domain), the UE may monitor the SSs (locations in time domain) corresponding to the CORESET with redefined limits. The redefined limits can be defined similar with other sections described herein.

In some embodiments, a new parameter or field in ControlResourceSet may be used. When the parameter or field is present or is set to 1 (or 0), the CORESET may be the target CORESET. The UE may monitor the slot with the target CORESET using the redefined limits. In some embodiments, a new parameter or field in ControlResourceSet may be used when the above parameter or field is present. This parameter or field may be used to indicate which of the SSs corresponding to the CORESET is the target SS. In some embodiments, a parameter may be used to indicate the ControlResourceSet list from which any on or more of, the redefined limits are to be applied. For example, CORESET-ConfigToAddModList-r17::=SEQUENCE
(SIZE (1 . . . maxCORESET))
OFControlResourceSet (or other parameter)

A parameter field in ControlResourceSet or other higher layer parameter may be used to indicate which SS is the target SS to which the redefined limits are to be applied:

CORESET-SS-ConfigToAddModList-r17::=SEQUENCE (SIZE (1 . . . . X0))

Where X0 is the SS number of the CORESET (e.g., bit string or bitmap for SS of the CORESET).

C. Redefining Limits According to the Target SS Number or SS Type.

Each SS may have an associated time domain period with a starting period defined, among others. UE may monitor the PDCCH Occasions according to the SS configuration. If a slot only corresponds to one SS, the expected number of PDCCH candidates and CCE number for blind decoding or detection may be less. If a slot corresponds to more SSs, the expected number of PDCCH candidates and CCE number for blind decoding or detection may be larger. Based on the SS, there are mainly three methods or procedures: (1) redefinition of the limits according to the target number of SSs per slot; (2) redefinition of the limits according to the target SS type; and (3) redefinition of the limits according to the target SS type and corresponding number of SSs (per slot).

Option 1: Redefinition of the Limits According to the Target Number of SSes Per Slot The higher target SS number, the larger $M_{PDCCH}^{max,slot,\mu}$ or $C_{PDCCH}^{max,slot,\mu}$ may be. A threshold value may be set. The threshold value x, by default or RRC configured by a new field may mean that if the target SS number is larger or equal than x, the limits may be the same with legacy. Otherwise, the redefined limits may be used. For example, using 1 bit to indicate two values or using two bits to indicate four values, each value may correspond to a specific threshold value.

The default threshold value can be a fixed value, or the half of the target SS number (rounding up or rounding down), or proportional to the target SS number (rounding up or rounding down). In some embodiments, multiple (n) threshold values may be set. Each threshold value may be indicated by X bits. In some embodiments, a threshold value set may be predefined, using a bitmap method to indicate which threshold value is selected.

For example, there may be n threshold values, denoted as $X_1$~$X_n$, $X_i$ with a range of 1~10 or with a range of 1~Tss, where Tss is the number of target SS number. The threshold value can be configured per BWP, or configured in PDCCH-Config, or the value can be UE specific configured by using RRC parameters. According to the threshold value, different intervals may correspond to different limits, as shown in the following:

| Interval for target SS number | Redefined limits | PDCCH candidates/CCE number limit X |
|---|---|---|
| 1~$X_1$ | Limit 1 | u = 0, X = x1 |
| | | u = 1, X = x2 |
| | | u = 2, X = x3 |
| | | u = 3, X = x4 |
| $X_1$ + 1~$X_2$ | Limit 2 | u = 0, X = y1 |
| | | u = 1, X = y2 |
| | | u = 2, X = y3 |
| | | u = 3, X = y4 |
| . . . | Limit i | . . . |
| $X_{n-1}$ + 1~$X_n$ | Limit n (Legacy) | u = 0, X = z1 |
| | | u = 1, X = z2 |
| | | u = 2, X = z3 |
| | | u = 3, X = z4 |

The redefined limits can be referred to other tables or methods.

Regarding the number of threshold values, one threshold value may mean or create two intervals. For example, 2 threshold values means 3 intervals. n threshold value may create n+1 intervals. The target SS number may be set as M. Dividing by M yields the following:

The SS number $$1 \sim \left\lceil \frac{M}{n+1} \right\rceil$$

for the first interval;

The SS number $$n * \left\lceil \frac{M}{n+1} \right\rceil + 1 \sim M$$

for the last interval; and

The SS number $$(i-1) * \left\lceil \frac{M}{n+1} \right\rceil + 1 \sim i * \left\lceil \frac{M}{n+1} \right\rceil$$

for the l-th interval

| Interval for target SS number | Redefined limits | PDCCH candidates/CCE number limit X |
|---|---|---|
| $1 \sim \left\lceil \frac{M}{n+1} \right\rceil$ | Limit 1 | u = 0, X = x1 |
| | | u = 1, X = x2 |
| | | u = 2, X = x3 |
| | | u = 3, X = x4 |
| $(i-1) * \left\lceil \frac{M}{n+1} \right\rceil + 1 \sim i * \left\lceil \frac{M}{n+1} \right\rceil$ | Limit i | u = 0, X = y1 |
| | | u = 1, X = y2 |
| | | u = 2, X = y3 |
| | | u = 3, X = y4 |
| . . . | . . . | . . . |

-continued

| Interval for target SS number | Redefined limits | PDCCH candidates/CCE number limit X |
|---|---|---|
| $n * \left\lceil \dfrac{M}{n+1} \right\rceil + 1 \sim M$ | Limit n + 1 (Legacy) | u = 0, X = z1 |
| | | u = 1, X = z2 |
| | | u = 2, X = z3 |
| | | u = 3, X = z4 |

The Value n can be default or configured by RRC parameters with $\log_2(n)$ or $\lceil \log_2(n) \rceil$ bits. For this option, the following may be some examples for different thresholds:

| Target SS number on the slot | PDCCH candidates/CCE number limit X |
|---|---|
| 1~5 | U = 1, X = x1 |
| | U = 2, X = x2 |
| | U = 3, X = x3 |
| | U = 4, X = x4 |
| 6~10 or 6~target SS number | U = 1, X = y1 |
| | U = 2, X = y2 |
| | U = 3, X = y3 |
| | U = 4, X = y4 |
| 1~2 | U = 1, X = x1 |
| | U = 2, X = x2 |
| | U = 3, X = x3 |
| | U = 4, X = x4 |
| 3~4 | U = 1, X = y1 |
| | U = 2, X = y2 |
| | U = 3, X = y3 |
| | U = 4, X = y4 |
| 5~6 | U = 1, X = z1 |
| | U = 2, X = z2 |
| | U = 3, X = z3 |
| | U = 4, X = z4 |
| 7~8 | U = 1, X = m1 |
| | U = 2, X = m2 |
| | U = 3, X = m3 |
| | U = 4, X = m4 |
| 9~10 | U = 1, X = n1 |
| | U = 2, X = n2 |
| | U = 3, X = n3 |
| | U = 4, X = n4 |
| 1~3 | U = 1, X = x1 |
| | U = 2, X = x2 |
| | U = 3, X = x3 |
| | U = 4, X = x4 |
| 4~6 | U = 1, X = y1 |
| | U = 2, X = y2 |
| | U = 3, X = y3 |
| | U = 4, X = y4 |
| 7~10 | U = 1, X = z1 |
| | U = 2, X = z2 |
| | U = 3, X = z3 |
| | U = 4, X = z4 |

Option 1 can also be applied for DCI formats or DCI size types to redefine the limits according to the number of DCI formats or DCI size types. The methods may be similar.

Target SS number on a slot may include: a number of USS; a number of cell specific CSS (type0, type0A, type1, type 2 CSS); a number of USS and UE group CSS (type 3 CSS); a number of UE group CSS (type 3 CSS); a number of SS indicated by searchSpacesToAddModList; and a number of all the SS, among others.

Option 2: Redefinition of the Limits According to the Target SS Type

Different SS type can be configured with different limits. An SS type may be defined to include at least one of: only USS on a slot (type 1); only UE group CSS on a slot (type 2); only Cell specific CSS on a slot (type 3); only USS and UE group CSS on a slot (type 4); only CSS (cell specific and UE group) on a slot (type5); only USS and cell specific CSS on a slot (type 6); and only USS, cell specific CSS and UE group CSS (type7), among others.

The UE may decode the SS related signaling or new field indicating which of the above type is to be used. The UE may identify the specific SS on the slot to be monitored. Based on the SS type, the UE may use: redefined PDCCH candidates or CCE number limits; legacy PDCCH candidates or CCE number limits; and redefined PDCCH candidates or CCE number limits, indicated by higher layer, for example:

| | |
|---|---|
| u = 0 | an integer interval or range, or n values |
| u = 1 | an integer interval or range, or n values |
| u = 2 | an integer interval or range, or n values |
| u = 3 | an integer interval or range, or n values |

The UE behavior can be described as the following. When the UE confirms a SS type on all the slots that is to be monitored, the UE may use the legacy limits or redefined limits. "UE use the limits" may refer to the UE monitoring the slot with or using the limits.

Option 3: Redefinition of the Limits According to the Target SS type and Corresponding SS Number If the SS number of type $X_i$ no less than threshold $x_i$, UE may monitor the slot based on the legacy or redefined limits. $X_i$ may refer to a SS type and $x_i$ may be the threshold value set for type $X_i$. For example:

| Type Number | Threshold Value for Each SS Type | PDCCH Candidates or CCE Number Limit Y |
|---|---|---|
| 1 | type1: threshold value $x_1$ | If the number of type1 SS is less or equal than threshold value $x_1$, use the redefined limits, otherwise the legacy. |
| 2 | Type1: $x_1$ (or another $x_1$) Type2: $x_2$ | If the number of type1 SS is less or equal than threshold value $x_1$, and the number of type2 SS is less or equal than threshold value x2, use the redefined limits, If the number of type1 SS is less or equal than threshold value $x_1$, and the number of type2 SS is larger than threshold value $x_2$, use the redefined limits, If the number of type1 SS is larger than |

| Type Number | Threshold Value for Each SS Type | PDCCH Candidates or CCE Number Limit Y |
|---|---|---|
| | | threshold value $x_1$, and the number of type2 SS is less or equal than threshold value $x_2$, use the redefined limits, If the number of type1 SS is larger than threshold value $x_1$, and the number of type2 SS is larger than threshold value $x_2$, use the redefined limits, the redefined limits including the legacy value. |
| 3 | Type1: $x_1$ (or another $x_1$) Type2: $x_2$ (or another $x_2$) Type3: $x_3$ | If the number of type1 SS is less, equal or larger than threshold value $x_1$, If the number of type2 SS is less, equal or larger than threshold value $x_2$, If the number of type3 SS is less, equal or larger than threshold value $x_3$, use the redefined limits, the redefined limits including the legacy value. |

The redefined limits may correspond to the legacy value or 0. If the value is 0, UE may forego monitoring the corresponding slot.

D. Target Slot Configuration

Besides all the slots in specific SS, the target slots from all the PDCCH Occasions for redefined limits can be configured. Different SS may have a corresponding periodicity or (period). The lowest common multiple of these periods may be referred to as M. In M slots, UE may monitor N PDCCH occasions (N slots). X bits may be used to indicate the redefined limits ($2^X$ values or $2^X$ tables) for each occasion in N slots. If X=1, it may be a bitmap with M bits for each occasion. Every M occasions, UE may use a complete cycle of the redefined limits in sequence. M can correspond to or define a period. The starting slot or occasion can be configured using RRC.

To define H continuous occasions, X bits may be used to indicate the redefined limits ($2^X$ values or $2^X$ tables) for each occasion or group occasions (multiple and continuous occasions) in H slots. If X=1, it may be a bitmap with H bits for each occasion or group occasions. Every H occasions, the UE may use the redefined limits circularly. H can correspond to or define a period. The starting slot can be high layer or be configured using RRC or default.

A period of time can be predefined, RRC-configured, or defined by timer or determined by DCI. In this period of time, UE may be monitoring the occasion with redefined limits. In addition, the UE may use the bitmap to indicate which slots are the same with legacy and which slots are using redefined limits in this period of time.

In every X slots, UE monitor one slot with legacy limits and other slots with predefined or redefined limits, or vice-versa. Or in every X slots, UE monitor some slots with legacy limits and other slots with predefined or redefined limits. The bitmap method may be used for each target slot. Value 0 may mean that the UE is to use the legacy limits and value 1 may means that the UE is to use the redefined limits. The redefined limit may be a value for a SCS. N bits may be used for each occasion for each target slot. The UE may use one of the values for PDCCH candidates or CCE number limits from $2^N$ values according to the RRC indication. In addition, the target slot can be predefined, can be RRC configured, or can be configured per BWP (e.g., in PDCCH-Config).

E. Redefinition of Limits for Slots in Discontinuous Reception (DRX)

In some embodiments, the wireless communication device may determine the at least one-time domain duration or the at least one target slot according to onDurationTimer, or determine the at least one time domain duration or the at least one target slot according to Inactivity-timer.

In a DRX period, at least one slot may be configured with legacy limits or at least one target slot may be configured with redefined limits. The target slots may be configured in DRX-config. The value for redefined limits can be shown in the following:

| | |
|---|---|
| u = 0 | an integer interval or range, or n values |
| u = 1 | an integer interval or range, or n values |
| u = 2 | an integer interval or range, or n values |
| u = 3 | an integer interval or range, or n values |

To determine the target slot, the UE may monitor the target slots with redefined limits. The slots may be as follows. In some embodiments, odd slot (even slot) may be configured with legacy limits and even slot (odd slot) may be configured with redefined limits. The even slot (odd slot) may be the target slot. In some embodiments, odd PDCCH occasion slot (even) may be configured with legacy limits. Even PDCCH occasion slot (odd slot) may be configured with redefined limits. The even PDCCH occasion slot (odd PDCCH occasion slot) may be the target slot. In some embodiments, UE monitor at least one time domain duration or the at least one target slot with upper limits in the onDurationTimer. In some embodiments, UE monitor at least one time domain duration or the at least one target slot with upper limits in the Inactivity-timer. In some embodiments, UE monitor at least one time domain duration or the at least one target slot with upper limits in the Inactivity-timer and onDuration Timer.

For every X slots, UE may monitor one (e.g., the first PDCCH occasion) slot with the legacy limits and the other slots with redefined limits. For every X PDCCH occasion slots, the UE may monitor one (e.g., the first) slot with the legacy limits and the other slots with redefined limits.

With a predefined threshold value of M, the UE may monitor the slots (occasion slots or slots) with redefined limits (legacy limits), and monitor with legacy limits (redefined limits) after M slots. Before drx-Inactivity Time starts, the UE may monitor with redefined limits or legacy limits. After the drx-Inactivity Timer starts, the UE may monitor with legacy limits or redefined limits. The UE may monitor occasion slots with redefined limits under long DRX (receive Long DRX command MAC CE). and the UE may monitor occasion slots with legacy limits under short DRX. The UE may monitor occasion slots with legacy limits under long DRX (receive Long DRX command mac CE). and the UE may monitor occasion slots with redefined limits under short DRX. If the limit value configured as 0, the UE may forego monitor the corresponding target slot.

F. Method for Monitoring Control Channels

Figure 3:
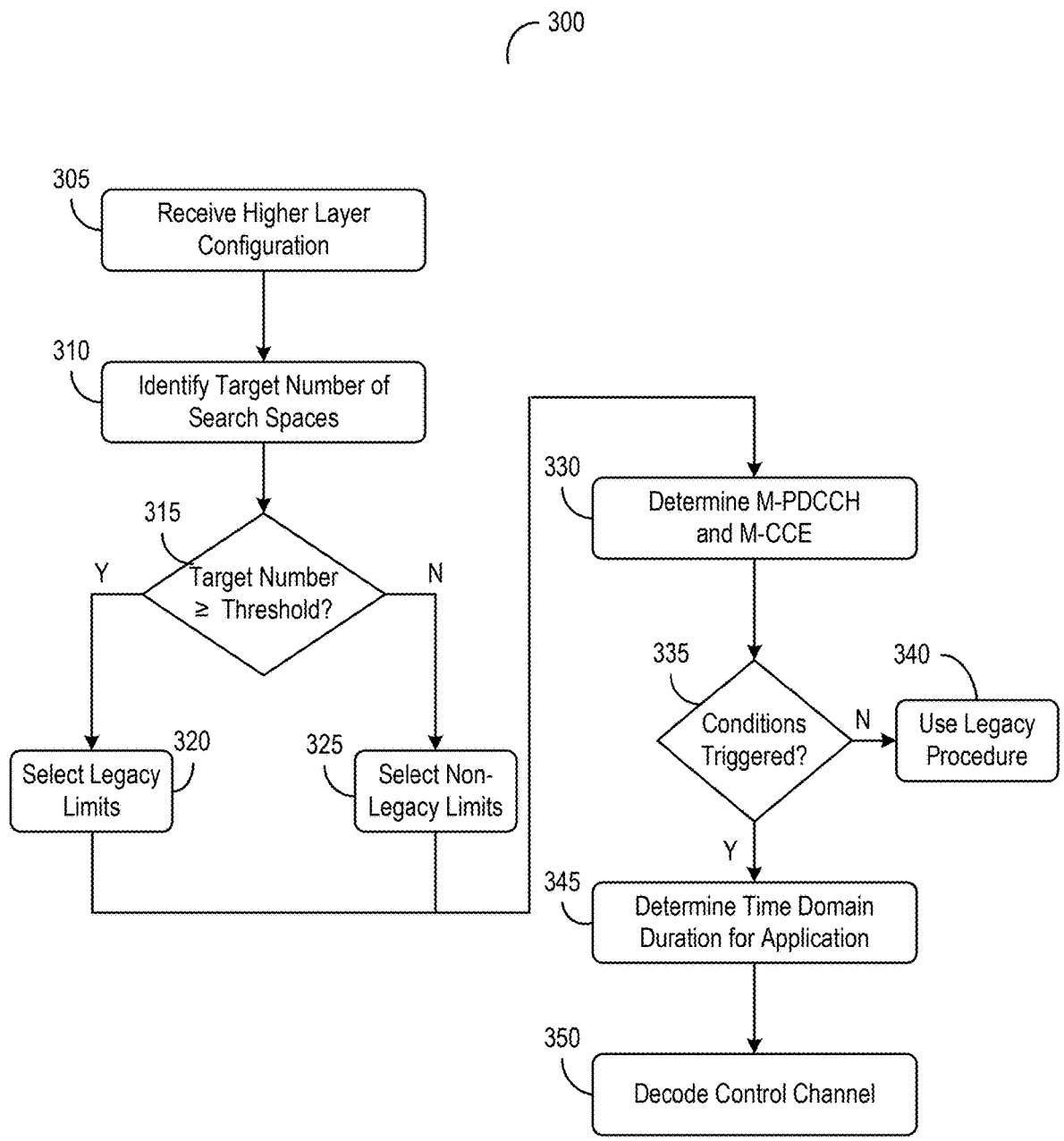
FIG. 3 illustrates a flow diagram of a method for monitoring control channels, in accordance with an illustrative embodiment.

Referring now to FIG. 3, depicted is a flow diagram of a method 300 for monitoring control channels. The method 300 may be performed by or implemented using any of the components detailed above in conjunction with FIGS. 1 and 2, such as the UE 104 and the BS 102. In brief overview, a wireless communication device may receive a higher layer configuration (305). The wireless communication device may identify a target number of search spaces (310). The wireless communication device may determine whether the target number of search spaces is greater than or equal to a threshold (315). When greater than or equal to, the wireless communication device may select legacy limits (320). When less than, the wireless communication device may select non-legacy limits (325). The wireless communication device may determine a maximum number of control channel candidates and a maximum number of control channel elements (330). The wireless communication device may determine whether conditions are triggered (335). If not triggered, the wireless communication device may use a legacy procedure (340). If triggered, the wireless communication device may determine a time domain duration for application (345). The wireless communication device may decode a control channel (350).

In further detail, a wireless communication device (e.g., UE 104) may retrieve, identify, or otherwise receive a higher layer configuration from a wireless communication node (e.g., BS 102) (305). The wireless communication node may provide, send, or transmit the higher layer configuration to the wireless communication device. The higher layer configuration may include one or more parameters, such as: radio resource control (RRC) parameters, discontinuous reception (DRX) parameters, bandwidth part (BWP) related parameters, and downlink control information (DCI) parameters, among others. The parameters of the higher layer configuration may specify, identify, or otherwise define a control channel (e.g., physical downlink control channel (PDCCH)) candidates per slot and control channel elements (CCE) number limits per slot. Each slot may correspond to or include a resource (e.g., time and frequency) for the control channel. The control channel candidates may identify or include a set of control channels in a single cell to be monitored by the wireless communication device. The CCE number limits may define or specify a number of non-overlapping elements in the single cell in the control channels.

The higher layer configuration received from the wireless communication node may define, specify, or otherwise identify a maximum number of control channels per slot (M-PDCCH) and a maximum number of non-overlapping CCEs per slot (M-CCE). In some embodiments, the M-PDCCH and the M-CCE may be determined, assigned, or otherwise configured on a per BWP-basis in accordance with the higher layer configuration. In some embodiments, the M-PDCCH and the M-CCE may be determined, assigned, or otherwise configured on a per search space basis in accordance with the higher layer configuration. In some embodiments, the M-PDCCH and the M-CCE may be determined, assigned, or otherwise configured via a RRC configuration. In some embodiments, the M-PDCCH and the M-CCE may be determined, assigned, or otherwise configured for a target control resource set (CORESET) according to the higher layer configuration (e.g., using a parameter or field in ControlResourceSet). In some embodiments, the M-PDCCH and the M-CCE may be determined, assigned, or otherwise configured for a target group SS according to the higher layer configuration.

The wireless communication device may determine or identify a target number of search spaces (SS) (310). Each search space may identify, define, or otherwise correspond to an area in a resource grid (e.g., downlink resource grid) in the cell that is to carry a control channel (e.g., PDCCH). The search spaces may include one or more UE-specific search spaces (USS) and one or more common search spaces (CSS). The USS may correspond to the portion of the resource grid allocated in particular to the wireless communication device. The CSS may correspond to the portion of the resource grid allocated to multiple wireless communication devices (e.g., all or a group of UEs) in the cell. In some embodiments, the wireless communication device may identify a target type of SS. The target type may include the USS, the CSS, or the UE group CSS. The target type of SS may be specified or defined by a configuration parameter (e.g., PDCCH-config) in the higher layer configuration.

The wireless communication device may identify any one or more of the USSs and CSSs in the cell for the target number of SSs (e.g., to compare with or to set to the target number). In some embodiments, the wireless communication device may identify all the USSs and CSSs in the cell as the target number of SSs. In some embodiments, the wireless communication device may identify the configured USSs as the target number of SSs. In some embodiments, the wireless communication device may identify the CSSs associated with a group UE to which the wireless communication device belongs and the USSs as the target number of SSs. In some embodiments, the wireless communication device may identify the USSs or CSSs indicated by a configuration parameter (e.g., PDCCH-config) in the higher layer configuration.

The wireless communication device may determine whether the target number of search spaces is greater than or equal to a threshold (315). In accordance to the target number of SSs, the wireless communication device may identify of determine the upper limits (e.g., M-PDCCH and the M-CCE). The threshold may identify or delineate a value for the target number of search spaces at which to select legacy values or non-legacy (sometimes referred herein as redefined) upper limits for the M-PDCCH and the M-CCE. In some embodiments, the wireless communication device can assign, set, or otherwise determine a set of thresholds against which to compare the target number of spaces. In some embodiments, the value for each threshold may be set by default or otherwise pre-configured at the wireless communication device. In some embodiments, the value for each threshold may be set by the higher layer configuration (e.g., RRC parameters or per BWP-basis).

In some embodiments, the wireless communication device may compare the target number of SSs against one or more of a set of ranges. Each range may define one or more values for the threshold for a portion of the corresponding SS. The number of set or ranges may correspond to a number of partitions in the time domain duration of the SSs. In some embodiments, the number of ranges may be configured as a default value. In some embodiments, the number of ranges may be configured via at least one RRC parameter of $\log_2(n)$ or $\lceil\log_2(n)\rceil$ number of bits. In accordance with the comparison, the wireless communication device may determine that the target number of SSs is within at least one range of the set of ranges. Using the identified range, the wireless communication device may determine the M-PDCCH and the M-CCE as legacy values or non-legacy values according to the range.

In some embodiments, the wireless communication device may determine the M-PDCCH and the M-CCE as legacy values or non-legacy values in accordance to the target type of SS. The wireless communication device may identify SSs in the slot to be monitored. For each identified SS, the wireless communication device may compare against the target type. Certain target types may be associated with legacy values, while other target types may be associated with non-legacy values. Based on the SS type, the wireless communication device may select the legacy values or non-legacy values for the M-PDCCH and the M-CCE. In some embodiments, the wireless communication device may determine the M-PDCCH and the M-CCE as legacy values or non-legacy values in accordance to the target type of SS in addition to the target number of SSs.

When the target number of SSs is determined to be greater than or equal to threshold, the wireless communication device may identify or select legacy limits (320). In some embodiments, the wireless communication device may identify legacy limits for the M-PDCCH and the M-CCE. On the other hand, when the target number of SSs is determined to be less than the threshold, the wireless communication device may identify or select non-legacy limits (325). In some embodiments, the wireless communication device may identify non-legacy or redefined limits for the M-PDCCH and the M-CCE. The selection of the legacy or non-legacy limits may be based on the target number of SSs or the target type of SSs, or a combination, among others.

The wireless communication device may identify or determine a maximum number of control channel candidates (e.g., M-PDCCH) and a maximum number of control channel elements (e.g., M-CCE) (330). The determination may be in accordance to any number of table discussed herein above. In some embodiments, the wireless communication device may identify or determine the M-PDCCH relative to a PDCCH-related limit. The wireless communication device may determine that the M-PDCCH is to be the same as a legacy PDCCH-related limit. The wireless communication device may determine that the M-PDCCH is to be the same as or less than the legacy PDCCH-related limit. In determining that that the M-PDCCH is to be the same as or less than the legacy PDCCH-related limit, the wireless communication device may identify or determine the M-PDCCH as having a candidate value that is the same as the legacy PDCCH-related limit, and at least another candidate value that is less than the legacy PDCCH-related limit. The wireless communication device may determine that the M-PDCCH is to be the same as or more than the legacy PDCCH-related limit. In determining that the M-PDCCH is to be the same as or more than the legacy PDCCH-related limit, the wireless communication device may identify or determine the M-PDCCH as having a candidate value that is the same as the legacy PDCCH-related limit, and at least another candidate value that is more than the legacy PDCCH-related limit.

In some embodiments, the wireless communication device may identify or determine the M-CCE relative to a CCE-related limit. The wireless communication device may determine that the M-CCE is to be the same as a legacy CCE-related limit. The wireless communication device may determine that the M-CCE is to be the same as or less than the legacy CCE-related limit. In determining that the M-CCE is to be the same as or less than the legacy CCE-related limit, the wireless communication device may identify or determine the M-CCE as having a candidate value that is the same as the legacy CCE-related limit, and at least another candidate value that is less than the legacy CCE-related limit. The wireless communication device may determine that the M-CCE is the same as or more than the legacy CCE-related limit. In determining that the M-CCE is the same as or more than the legacy CCE-related limit, the wireless communication device may determine the M-CCE as having a candidate value that is the same as the legacy CCE-related limit, and at least another candidate value that is more than the legacy CCE-related limit.

The wireless communication device may determine whether conditions are satisfied to trigger the upper limits according to the higher layer configuration according to the higher layer configuration (335). The upper limits may correspond to or include the M-PDCCH to be monitored in one or more slots and the M-CCE in one or more slots as discussed above. The conditions to be satisfied may include at least one feature that is configured or is configured and enabled at the wireless communication device. In some embodiments, the wireless communication device may determine or identify the features. The features may include one or more of: coverage enhancement, specific UE category, antenna number, same slot scheduling, cross slot scheduling, or a higher layer configuration (e.g., RRC configuration) among others. The features may be indicated in the higher layer configuration. In some embodiments, the wireless communication device may determine whether to define the M-PDCCH and the M-CCE on a per slot basis or over multiple slots. The definition may be determined from the higher layer configuration.

To identify, the wireless communication device may provide, transmit, or send an indication of capability of the wireless communication device to support the feature to the wireless communication node. The indication may be transmitted in a message (e.g., UECapabilityInformation message or UEAssistanceInformation message) to the wireless communication node. Upon receipt of the indication, the wireless communication node may identify or determine the feature to be compared against for the condition. The wireless communication node may provide, transmit, or provide a response to the wireless communication device. The response may identify the feature to be compared against for the condition. In some embodiments, the response may be part of the higher layer configuration detailed above. In some embodiments, the response may be provided via a master information block (MIB), a system information block (SIB), or RRC parameters. In turn, the wireless communication device may use the feature indicated in the response to compare against. In some embodiments, the wireless communication device may determine the feature in accordance with the higher layer configuration received from the wireless communication node.

With the identification, the wireless communication device may compare the features to the one or more condition. The wireless communication device may determine that one or more of the identified features (e.g., coverage enhancement, a specific UE category, an antenna number, same slot scheduling, or cross slot scheduling) are configured or enabled. Based on this determination, there wireless communication device may determine that the conditions are satisfied to trigger the upper limits for M-PDCCH or M-CCE. On the other hand, the wireless communication device may determine that one or more of the identified features are not configured or disabled. Based on this determination, the wireless communication device may determine that the conditions are not satisfied to trigger the upper limits. If the conditions are determined to be not satisfied, the wireless communication device may use a legacy procedure (340). The legacy procedure may be applied by the wireless communication device to monitor and decode control channels for the wireless communication device. In some embodiments, the wireless communication device may use less than upper limits in performing the monitoring.

On the other hand, if the conditions are determined to be satisfied, the wireless communication device may identify or determine a time domain duration for application of the upper limits (345). The time domain duration may include or correspond to at least one target slot, at least one target SS, at least one target slot in the target SS, or a PDCCH occasion of the target SS. In some embodiments, the wireless communication device may identify or determine a predefined time domain duration as the time domain duration to apply the upper limits. In some embodiments, the wireless communication device may identify or determine the time domain duration in accordance with an RRC configuration (e.g., received via the higher layer configuration. In some embodiments, the wireless communication device may identify or determine the time domain duration from the BWP (e.g., as specified or defined by the configuration for the BWP). In some embodiments, the wireless communication device may identify or determine the time domain duration using a timer. The timer may be maintained while monitoring the control channel.

In some embodiments, the wireless communication device may identify or determine the target slots to apply the upper limits for PDCCH monitoring according to any number of factors related to slots. In some embodiments, the wireless communication device may determine the target slots to apply the upper limits for PDCCH monitoring according to configured slots, via a radio resource control (RRC) configuration. In some embodiments, the wireless communication device may determine the target slots to apply the upper limits for PDCCH monitoring according to slots types. The slot types may identify or include semi persistent scheduling downlink (SPS-DL) slots or non-SPS-DL slots. In some embodiments, the wireless communication device may determine slots types. The slot types may include configured grant uplink (CG-UL) slots or non-CG-DL slots. In some embodiments, the wireless communication device may determine the target slots to apply the upper limits for PDCCH monitoring according to at least one slot index with legacy or non-legacy limits.

In some embodiments, the wireless communication device may identify or determine the time domain duration from downlink control information (DCI) (e.g., as specified or defined by the DCI). In some embodiments, the wireless communication device may identify or determine the time domain duration based on a number (X) of bits in the RRC configuration or DCI, of which a number (H) of time domain durations are to be applied to the upper limits. The upper limits to be applied may include the non-legacy or redefined limits.

In some embodiments, the wireless communication device may identify or determine the time domain duration in accordance with a configuration for DRX (e.g., from the higher layer configuration). In accordance with the configuration for DRX, the wireless communication device may identify or determine one of an even slot and an odd slot as comprising the legacy limits. Conversely, the wireless communication device may identify or determine another of the even slot and the odd slot as comprising the non-legacy limits. Either the even slot or the odd slot may be a target slot. An even slot may correspond to an even-numbered slot and an odd slot may correspond to an odd-numbered slot.

In some embodiments, the wireless communication device may monitor using one of the non-legacy or legacy limits based on a timer in accordance with the DRX configurations. The wireless communication device may identify or determine prior to start of onDurationTimer, to apply the upper limits as comprising non-legacy limits. Conversely, the wireless communication device may identify or determine after the start of the onDurationTimer, to apply the upper limits as comprising legacy limits.

The wireless communication device may process or otherwise decode a control channel (e.g., PDCCH) according to the upper limits within the time domain duration (350). The wireless communication device may monitor the search space of the PDCCH within the time domain duration. From the data gathered from monitoring, the wireless communication device may decode the PDCCH by applying the upper limits. By decoding, the wireless communication device may find or identify PDCCH data (e.g., DCI). In some embodiments, the wireless communication device may apply blind decoding to search for the PDCCH within the target slot, target SS, or PDCCH occasion.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method, comprising:
receiving, by a wireless communication device from a wireless communication node, a higher layer configuration;
determining, by the wireless communication device, a time domain duration to apply upper limits, according to: a predefined time domain duration, a radio resource control (RRC) configuration, a timer, downlink control information (DCI), or a bandwidth part (BWP);
determining, by the wireless communication device, the upper limits as comprising one of first limits or second limits for physical downlink control channel (PDCCH) monitoring according to the time domain duration and at least one of a target type of search space (SS), a target number of SSs, or at least one target slot; and
decoding, by the wireless communication device, at least one PDCCH according to the upper limits,
wherein the upper limits for PDCCH monitoring comprises at least one of: a maximum number of PDCCH candidates to be monitored in one or more slots (M-PDCCH) or a maximum number of non-overlapping control channel elements (CCEs) in one or more slots (M-CCE).

2. The method of claim 1, comprising:
determining, by the wireless communication device, the upper limits according to a coverage enhancement feature, a user equipment (UE) category, an antenna number, a same slot scheduling or cross slot scheduling, or a radio resource control (RRC) configuration.

3. The method of claim 1, comprising:
determining, by the wireless communication device, that at least one of:
the M-PDCCH is same as or less than a legacy PDCCH-related limit, or
the M-CCE is same as or less than a legacy CCE-related limit.

4. The method of claim 1, wherein the higher layer configuration is used to trigger the upper limits for PDCCH monitoring, or to include the target type of SS.

5. The method of claim 1, wherein the higher layer configuration is at least one of:
configured on a per bandwidth part (BWP) basis according to the higher layer configuration, or
configured on a per search space (SS) basis according to the higher layer configuration, or configured via a radio resource control (RRC) configuration, or configured for a target control resource set (CORESET) or target SS group according to the higher layer configuration.

6. The method of claim 1, wherein:

if the target number of SSs is larger than or equal to a threshold, the upper limits comprise the first limits, or if the target number of SSs is less than the threshold, the upper limits comprise the second limits or redefined limits.

7. The method of claim 1, comprising:

determining, by the wireless communication device, the upper limits according to the target number of SSs, by:

determining that the target number of SSs is within a first range of a plurality of ranges; and determining the upper limits according to the first range.

8. The method of claim 1, comprising:

determining, by the wireless communication device, target slots to apply the upper limits for PDCCH monitoring, according to:

configured slots, via a radio resource control (RRC) configuration, slots types, comprising semi persistent scheduling downlink (SPS-DL) slots or non-SPS-DL slots, slots types, comprising configured grant uplink (CG-UL) slots or non-CG-DL slots, or at least one slot index with the first limits or the second limits.

9. The method of claim 1, comprising:

determining, by the wireless communication device, at least one time domain duration or at least one target slot to apply the upper limits; or decoding, by the wireless communication device, at least one PDCCH according to the upper limits, within the at least one time domain duration or the at least one target slot.

10. The method of claim 9, comprising:

determining, by the wireless communication device, the at least one time domain duration or the at least one target slot to apply the upper limits, according to a configuration for discontinuous reception (DRX).

11. The method of claim 10, comprising:

determining, by the wireless communication device, a first slot of an even slot and an odd slot as comprising the first limits, and a second slot of the even slot and the odd slot as comprising the second limits, wherein the first slot or the second slot is a target slot.

12. The method of claim 10, comprising:

determining, by the wireless communication device, the at least one time domain duration or the at least one target slot according to onDuration Timer, or determining, by the wireless communication device, the at least one time domain duration or the at least one target slot according to Inactivity-timer.

13. The method of claim 1, comprising sending, by the wireless communication device to the wireless communication node, an indication of a capability of the wireless communication device to support a feature associated to the upper limits.

14. A method, comprising:

sending, by a wireless communication node to a wireless communication device, a higher layer configuration; and causing the wireless communication device to:

determine a time domain duration to apply upper limits, according to: a predefined time domain duration, a radio resource control (RRC) configuration, a timer, downlink control information (DCI), or a bandwidth part (BWP);

determine the upper limits as comprising one of first limits or second limits for physical downlink control channel (PDCCH) monitoring according to the time domain duration and at least one of a target type of search space (SS), a target number of SSs, or at least one target slot; and decode at least one PDCCH according to the upper limits, wherein the upper limits for PDCCH monitoring comprises at least one of: a maximum number of PDCCH candidates to be monitored in one or more slots (M-PDCCH) or a maximum number of non-overlapping control channel elements (CCEs) in one or more slots (M-CCE).

15. A wireless communication device, comprising:

at least one processor configured to:

receive, via a receiver from a wireless communication node, a higher layer configuration;

determine a time domain duration to apply upper limits, according to: a predefined time domain duration, a radio resource control (RRC) configuration, a timer, downlink control information (DCI), or a bandwidth part (BWP);

determine the upper limits as comprising one of first limits or second limits for physical downlink control channel (PDCCH) monitoring at least one of according to the time domain duration and at least one of a target type of search space (SS), a target number of SSs, or at least one target slot; and decode at least one PDCCH according to the upper limits, wherein the upper limits for PDCCH monitoring comprises at least one of: a maximum number of PDCCH candidates to be monitored in one or more slots (M-PDCCH) or a maximum number of non-overlapping control channel elements (CCEs) in one or more slots (M-CCE).

16. A wireless communication node, comprising:

at least one processor configured to:

send, via a transmitter to a wireless communication device, a higher layer configuration; and cause the wireless communication device to:

determine a time domain duration to apply upper limits, according to: a predefined time domain duration, a radio resource control (RRC) configuration, a timer, downlink control information (DCI), or a bandwidth part (BWP);

determine the upper limits as comprising one of first limits or second limits for physical downlink control channel (PDCCH) monitoring according to the time domain duration and at least one of a target type of search space (SS), a target number of SSs, or at least one target slot; and decode at least one PDCCH according to the upper limits, wherein the upper limits for PDCCH monitoring comprises at least one of: a maximum number of PDCCH candidates to be monitored in one or more slots (M-PDCCH) or a maximum number of non-overlapping control channel elements (CCEs) in one or more slots (M-CCE).

* * * * *